US008123453B2

(12) United States Patent
Lonardi et al.

(10) Patent No.: US 8,123,453 B2
(45) Date of Patent: Feb. 28, 2012

(54) CHARGING DEVICE FOR A SHAFT FURNACE

(75) Inventors: Emile Lonardi, Bascharage (LU); Giovanni Cimenti, Bertrange (LU)

(73) Assignee: Paul Wurth S.A., Luxembourg (LU)

( * ) Notice: Subject to any disclaimer, the term of this patent is extended or adjusted under 35 U.S.C. 154(b) by 890 days.

(21) Appl. No.: 12/161,643

(22) PCT Filed: Dec. 8, 2006

(86) PCT No.: PCT/EP2006/069468
§ 371 (c)(1), (2), (4) Date: Jul. 21, 2008

(87) PCT Pub. No.: WO2007/082605
PCT Pub. Date: Jul. 26, 2007

(65) Prior Publication Data

US 2011/0002758 A1 Jan. 6, 2011

(30) Foreign Application Priority Data

Jan. 20, 2006 (LU) .......................................... 91217

(51) Int. Cl.
*B65G 65/00* (2006.01)

(52) U.S. Cl. ......................... 414/301; 414/195; 414/299

(58) Field of Classification Search .................. 414/301, 414/195, 299; 222/460, 564, 185.1
See application file for complete search history.

(56) References Cited

U.S. PATENT DOCUMENTS 4,081,004 A * 3/1978 Harris ............................. 141/10
5,687,780 A * 11/1997 Minami ......................... 141/286

FOREIGN PATENT DOCUMENTS

DE 3706654 11/1995
JP 60208404 10/1985
JP 61223113 10/1986

OTHER PUBLICATIONS

D2: Book extract of Efimenko G.G., Gimmelfarb A.A., Levchenko V.E., “Metallurgy of cast iron”, 2nd Ed., 1974, pp. 19-27 and 310-337.
A International Search Report PCT/EP2006/069468 Dated May 2, 2007.

* cited by examiner

*Primary Examiner* — Saul Rodriguez
*Assistant Examiner* — Willie Berry, Jr.
(74) *Attorney, Agent, or Firm* — Cantor Colburn LLP

(57) ABSTRACT

A charging device for a shaft furnace, which includes at least one charging hopper having a discharge orifice arranged in a position off-centre with respect to the central axis of the shaft furnace, and a material distribution device arranged below this hopper. The material distribution device includes a feed channel coaxial with the central axis of the furnace and a rotatable, pivotable chute, which is arranged below the feed channel for distributing a charge in the shaft furnace. The charging device also includes a connecting box in the shape of a funnel, arranged between the material distribution device and the charging hopper. The connecting box possesses a lower central outlet communicating with the charging hopper and at least one upper inlet which is arranged off-centre with respect to the central axis of the furnace and communicates with the discharge orifice of the hopper. According to the invention, the charging device includes at least one spreader situated upstream of the distribution device, on the trajectory of the material discharged from the discharge orifice. The spreader enables a flow of material to be dispersed to both sides of the feed channel.

23 Claims, 4 Drawing Sheets

CHARGING DEVICE FOR A SHAFT FURNACE

TECHNICAL FIELD OF THE INVENTION

This invention concerns a device for charging a shaft furnace, especially a blast furnace, comprising at least one and in general several charging hoppers which normally act as air-lock reservoirs and are connected by a connecting box to a material distribution device with a rotatable, pivotable chute for distributing the charge inside the shaft furnace.

BRIEF DISCUSSION OF RELATED ART

There is a considerable number of charging devices of this type that equip blast furnaces around the world. For a blast furnace, charging normally takes place as follows: when a first hopper is being charged under atmospheric pressure, a second hopper, which is then under blast furnace pressure, discharges its load through the connecting box into a central feed channel of the material distribution device. Fed by this central channel, the rotatable, pivotable chute distributes the charge over the charging surface of the furnace. When the second hopper is empty, it is isolated from the furnace and reduced to atmospheric pressure for refilling. The first hopper or, as the case may be, a third hopper, which has been previously filled, is then put under blast furnace pressure ready to feed the material distribution device.

With these charging devices, the flow of material leaving the hoppers normally follows a trajectory off-centre with respect to the central axis of the furnace, due to the eccentric position of the hoppers. It follows that the zone of impact on the rotatable, pivotable chute is variable and asymmetrical, and when the chute is in its withdrawn, inactive position, the impact on the charging surface of the furnace will not be central. On the one hand, asymmetrical, variable impact on the chute complicates the distribution procedure, because the distance over which the material slides along the chute varies with the angular position of the chute and depends on the hopper that is used. On the other hand, the eccentric trajectory from the chute poses a problem, especially when it is desired to improve the performance of a blast furnace by forming a coke chimney in the furnace charge around the central axis of the blast furnace. Using the charging devices described above, it is barely possible to form such a chimney of coke, as the devices are incapable of directing their loads accurately towards the centre of the furnace. Various solutions to this problem have been proposed, for example in the Luxembourg patents LU 85879, LU 86336 and LU 86340 of the applicant. In classical charging installations, the material being charged flows along the inclined wall of the connecting box before it reaches the rotatable, pivotable chute. The solutions mentioned above consist essentially in providing an additional conical funnel inside the connecting box. The output from this funnel is controlled by a metering unit in order to form a retainment of material in the funnel. In this way, the asymmetrical outflow into the chute is reduced or eliminated. However, these solutions require the installation of an elaborate control procedure as well as substantial and complex modifications to the classical charging device.

BRIEF SUMMARY OF THE INVENTION

The invention proposes a charging device for a shaft furnace that allows, by simple means, centring the trajectory of the charge on the central axis of the furnace.

The invention provides a shaft furnace charging device comprising at least one charging hopper with a discharge orifice arranged offset with respect to the central axis of the shaft furnace, and a material distribution device arranged below this hopper. The material distribution device comprises a feed channel coaxial with the central axis of the furnace and a rotatable, pivotable chute arranged below the feed channel designed for distributing a charge into the shaft furnace. The charging device also comprises a funnel-shaped connecting box arranged between the material distribution device and the charging hopper. This connecting box possesses a lower central outlet communicating with the feed channel and at least one upper inlet arranged offset, i.e. off-centre with respect to the central axis of the furnace and communicating with the discharge orifice of the hopper. According to an important aspect of the invention, the charging device comprises at least one dispersion means—a spreader—situated upstream of the above-mentioned distribution device and on the trajectory of material discharged from the discharge orifice, that allows dispersing a flow of material to both sides of the above-mentioned feed channel.

It is known that, due to the funnel shape of the box, horizontal components of velocity will inevitably be communicated to each flow of matter entering off-centre and passing through the box. Consequently, the flow leaving the feed channel becomes eccentric. On the rotatable, pivotable chute, when the latter rotates, such an eccentric flow travels variable sliding distances. In fact, the zone of impact on the chute depends on the relative rotational position of the chute when the incident flow is not coaxial. The sliding distance travelled on the chute governs the degree of deceleration of the material. The result is that the speed of the material leaving the chute also depends on the rotational position of the chute. Thus it is not easy to achieve a desired charge profile of concentric circular zones, and the profile obtained often tends to be rather elliptical. Furthermore, the formation of a coke chimney, if this is desired, is also hampered.

The spreader according to the invention makes it possible to divide a flow of material discharged from the hopper and to disperse it, in the form of at least two separate flows, on to opposite sides of the inclined surfaces of the connecting box, that is to say to both sides of the feed channel. When the flows thus previously separated by the spreader come together again, the collision between them is sufficient to reduce or eliminate their horizontal components of velocity, thus creating a flow which is essentially centred, that is to say, essentially coaxial with the central axis of the furnace. Considering such a spreader, it will be appreciated that it is mechanically simple and hence reliable, that it can easily be arranged inside the connecting box and that its installation requires only few modifications to known charging devices.

According to a simple embodiment, the spreader comprises a spreader plate arranged inside the connecting box. According to a first variant of the invention, this spreader plate is a fixed horizontal plate. According to a second variant of the invention, this spreader plate is a pivotable plate that can be pivoted between an operating position and a non-operating position. In operating position, the plate is generally positioned horizontally so as to constitute an obstacle transverse to the direction of flow. In non-operating position, the plate is withdrawn, for example along the vertical direction, so as not to impede the flow of material.

In the case of a pivotable plate, the spreader plate advantageously has a geometry enabling it to at least partially cover the feed channel when in operating position. A pivotable plate can be greater in area than a fixed plate. The fact that it can at least partially cover the feed channel when in operating position makes it possible to optimize the spreading of material across the whole channel.

In an advantageous embodiment, the spreader also comprises a retaining edge by means of which an accumulation of material can be retained on the spreader. Such an accumulation can, in particular, reduce the effects of abrasive wear of the spreader. For efficient division and diversion of the flow of material, the spreader preferably comprises two opposite sides arranged contiguous with the walls of the connecting box.

In an advantageous embodiment, the feed channel comprises a first upper tubular section and a second lower tubular section, the horizontal cross-section of the first and/or the second tubular section tapering along the direction of material flow. This enables further improvement of the degree of centring of the flow of material at the outlet of the feed channel.

It is evident that the invention lends itself particularly well to a charging device employing several hoppers and to use in blast furnaces. It will also be appreciated that the spreader as described can easily be incorporated into an existing charging device as an improvement. In a preferred embodiment, the charging device comprises three charging hoppers, each having a discharge orifice offset with respect to the central axis of the furnace and comprising three spreaders, each discharge orifice having its respective spreader associated with it.

BRIEF DESCRIPTION OF THE DRAWINGS

Other features and characteristics of the invention will become apparent in the detailed description of two advantageous forms of embodiment presented below, with reference to the attached drawings, in which.

DETAILED DESCRIPTION OF THE INVENTION

Figure 1:
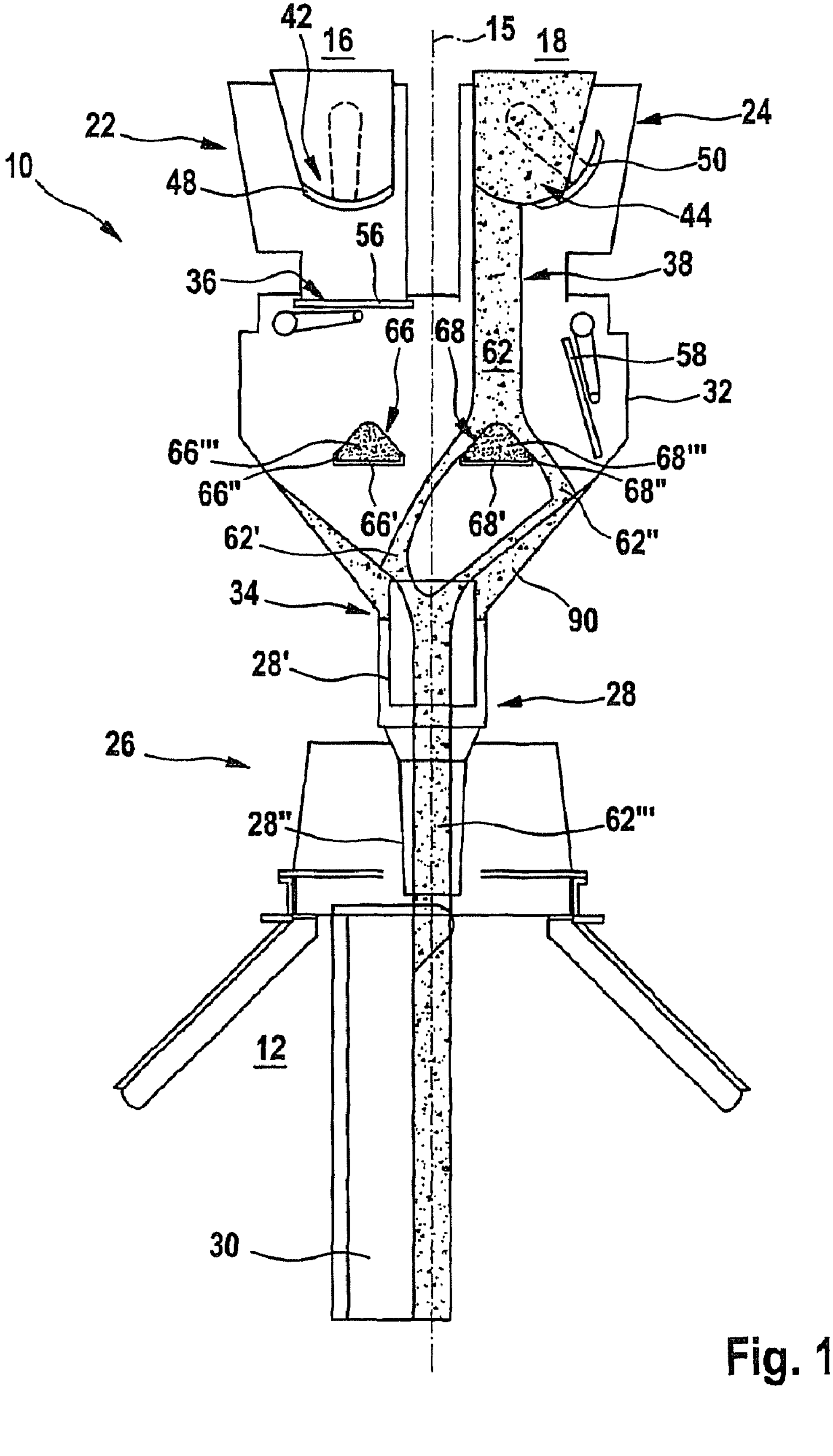
FIG. 1 is a vertical cross-section, along the axis I-I in FIG. 2, showing a charging device for a shaft furnace according to a first embodiment.
Figure 3:
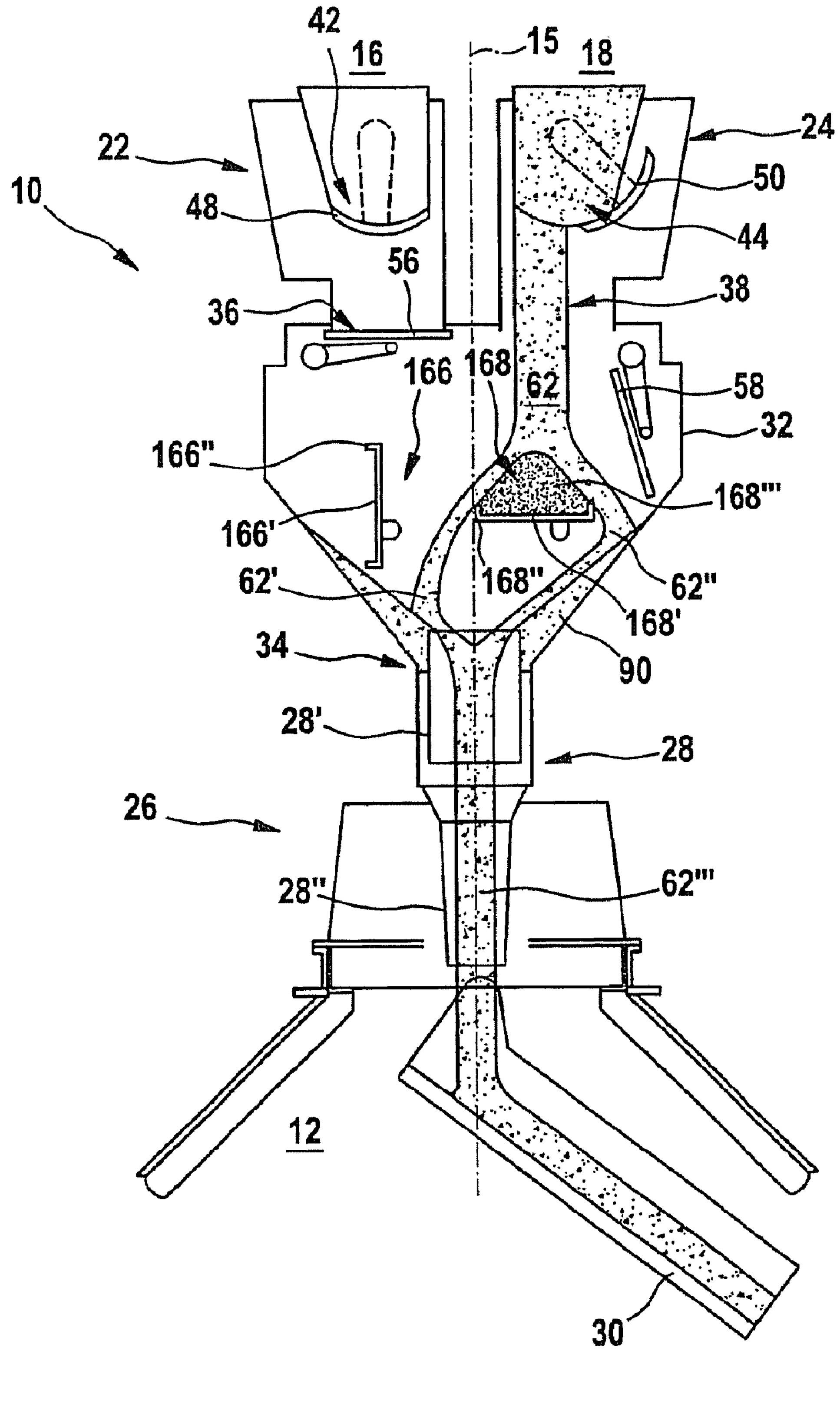
FIG. 3 is a vertical cross-section along the axis III-III in FIG. 4, showing a charging device for a shaft furnace according to a second embodiment.

A charging device, generally identified by reference number 10, is shown as an example in FIGS. 1 and 3. This charging device 10 equips a blast furnace throat 12, which is not shown in its entirety in the drawings. Reference 15 identifies the central axis of this blast furnace.

The charging device 10 comprises, in known manner, a first hopper 16, a second hopper 18 and a third hopper 20, which act as airlock reservoirs for the material to be charged. Only the lower parts 22, 24 of the first and second hoppers 16, 18 are shown in the drawings. Although the third hopper 20 and its lower part 25 are present, they are not visible in the cross-sections. In FIGS. 1 and 3, it can be seen that the hoppers 16, 18 are arranged side by side, off-centre with respect to the central axis 15 of the blast furnace. The same applies to the third hopper 20. In fact, the three hoppers 16, 18, 20 are arranged symmetrically with respect to the central axis 15.

The reference number 26 generally identifies a material distribution device arranged below the hoppers 16, 18, 20. This material distribution device 26 comprises, in known manner, a feed channel 28 coaxial with the central axis 15 of the blast furnace and a rotatable, pivotable chute 30. The latter is arranged below the feed channel 28 and can turn round the central axis 15 and pivot about an essentially horizontal axis of suspension, so as to be able to distribute the charge through the throat 12 on to the charging surface of the blast furnace (not shown).

A connecting box 32 is arranged vertically between the material distribution device 26 and the hoppers 16, 18, 20. The connecting box 32 is essentially funnel-shaped. It comprises, in known manner, a lower discharge outlet 34 which communicates with the feed channel 28 of the material distribution device 26, and three upper inputs 36, 38, 40 arranged symmetrically with respect to the central axis 15 and connected to the lower parts 22, 24, 25 of the hoppers 16, 18, 20. Only the inputs 36 and 38 of the first and second hoppers 16 and 18 are shown in FIGS. 1 and 3. The lower parts 22, 24, 25 of the hoppers 16, 18, 20 are provided with respective discharge orifices 42, 44, 46, of which only the discharge orifices 42 and 44 are shown. Due to the positioning of the hoppers 16, 18, 20, it follows that the discharge orifices 42, 44, 46 are also off-centre with respect to the central axis 15 of the blast furnace.

In known manner, for each of the hoppers 16, 18, 20, a material gate valve 48, 50, 52 respectively serves to interrupt and control the flow to be discharged alternatively via one of the discharge orifices 42, 44, 46. A lower sealing valve 56, 58, 60 is associated with each of the material gate valves 48, 50, 52 and serves to seal the hopper 16, 18, 20 with respect to the blast furnace. It should also be noted, that respective upper sealing valves, mounted at the upper end of the hopper 16, 18, 20 and serving to seal the latter with respect to the outer atmosphere, is not shown in the figures.

Figure 2:
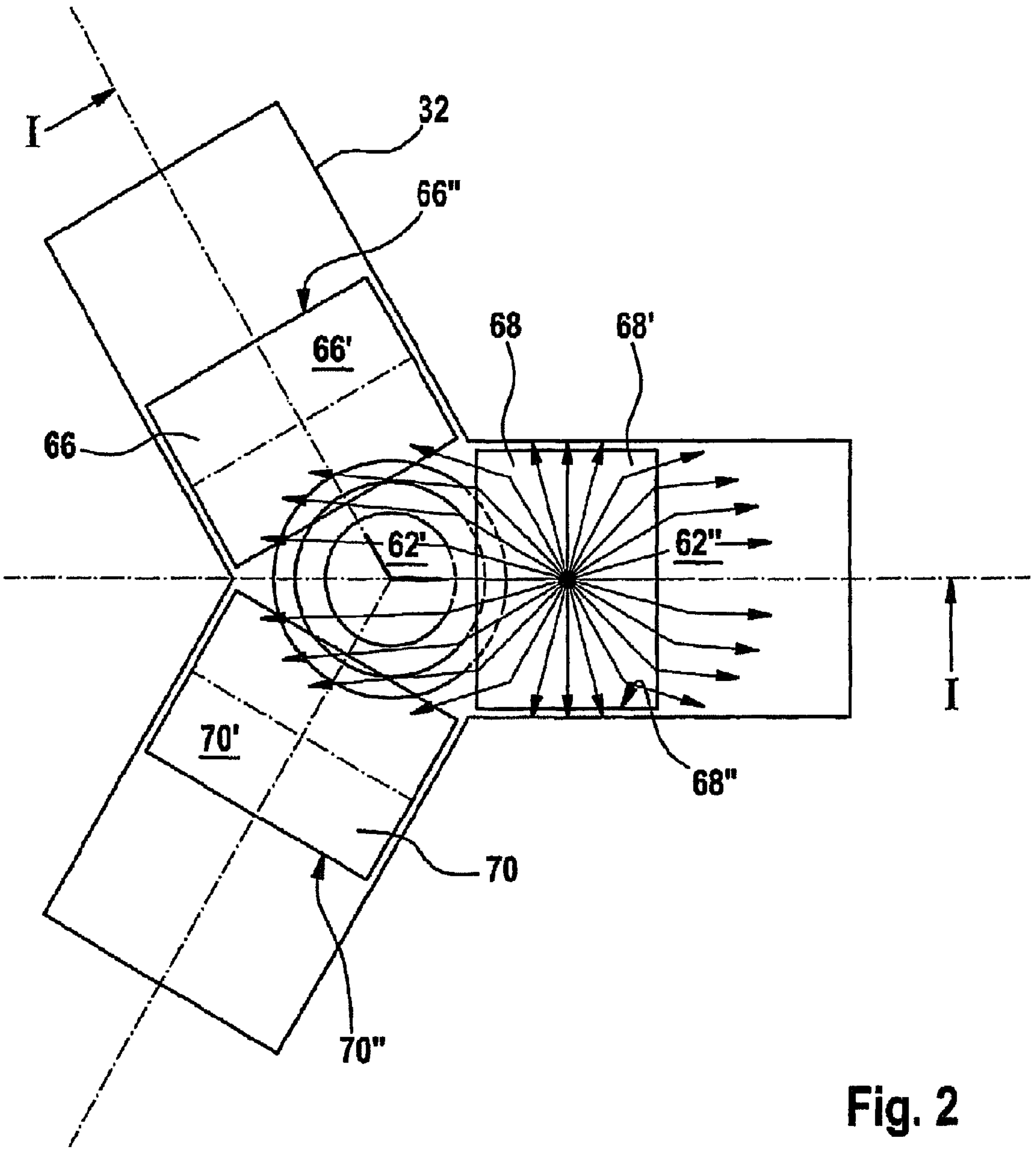
FIG. 2 is a horizontal cross-section of the device according to FIG. 1, showing the spreaders.

FIG. 1 shows a flow 62 of charge material being discharged from the second hopper 18 to be distributed by the rotating, pivoting chute 30. Also shown in FIG. 1 are a first spreader 66 and a second spreader 68. A third spreader 70 associated with the third hopper 20 is shown in FIG. 2. Each of these spreaders 66, 68, 70 is situated on the natural trajectory of the flow of material discharged by the respective hopper 16, 18, 20, that is to say vertically below the discharge orifices 36, 38, 40 from which the material flows out.

In charging phase, the spreaders 66, 68, 70 serve to spread the material flow and thus to divide it and divert it towards different sides of the inclined walls of the connecting box 32. In particular, as can be seen in FIGS. 1 and 3 for the spreader 68 and the flow 62, the spreaders 66, 68, 70 serve to divide the material flow, 62 for example, essentially into two separate partial flows, as indicated by the references 62' and 62". Because they are spread in this way, these flows 62' and 62" are directed to both sides of the feed channel 28, on to opposite parts of the inclined inner walls of the connecting box 32. These partial flows 62' and 62" are thus distributed both sides of a plane passing through the central axis 15 and perpendicular to the plane of FIGS. 1 and 3. The mass flow rates of the partial flows 62' and 62" are similar. It will thus be appreciated that a collision between the partial flows 62' and 62" in the region of the lower discharge outlet 34 of the connecting box 32 will result from their deflection along the two free sides of the spreaders 66, 68, 70. This collision creates a single flow which is essentially coaxial with the central axis 15. It will also be appreciated that the dispersion into two partial flows 62' and 62" and their collision will substantially reduce or even eliminate horizontal velocity components. Irrespective of which of the hoppers 16, 18, 20 it originates from, each recombined flow presents the same impact zone on the rotatable, pivotable chute 30. Since this impact zone is centred on the central axis 15, by virtue of the corresponding spreader

66, 68, 70, it will be appreciated that the velocity of the material issuing from the chute 30 is independent of the rotational position of the chute 30. Furthermore, each recombined flow has the advantage of impacting centrally on the charging surface of the blast furnace when the chute is withdrawn (i.e. out of the way) and inactive, as shown in FIG. 1. An example of a such a recombined material flow is indicated by the reference 62''' in FIGS. 1 and 3 for a discharge issuing from the second hopper 18.

FIG. 2 shows the three spreaders 66, 68, 70 and their position inside the connecting box 32. The spreaders 66, 68, 70 are arranged symmetrically with respect to the central axis 15. Each of the three spreaders 66, 68, 70 shown in FIG. 2 comprises a spreader plate 66', 68', 70' of rectangular shape with a retaining edge 66", 68", 70". As is clearly visible in FIG. 1, the retaining edges 66", 68", 70" serve to retain an accumulation 66''', 68''', 70''' of material, conical in shape, on the spreader plates 66', 68', 70'. This accumulation 66''', 68''', 70''' of material serves to reduce the abrasion on the plate 66', 68', 70' resulting from the considerable quantities of material charged into the blast furnace. The spreader plates 66', 68', 70' and the retaining edges 66", 68", 70" are made from a material of high mechanical strength, such as wear-resistant steel or steel clad with an appropriate ceramic material.

Figure 4:
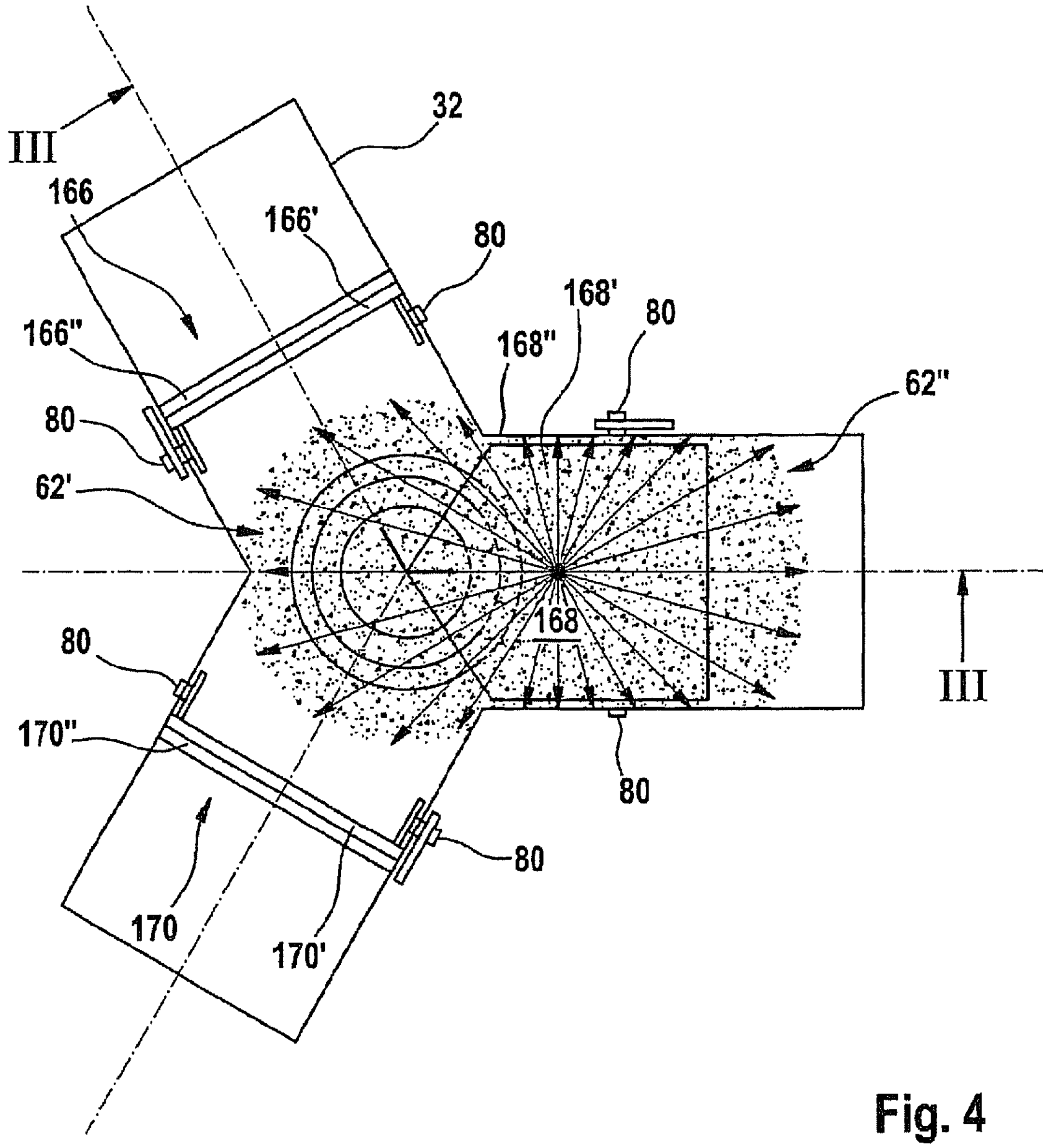
FIG. 4 is a vertical cross-section through the device according to FIG. 3, showing other spreaders.

In the embodiment according to FIGS. 1 and 2, the spreader plates 66', 68', 70' are fixed immovably in a horizontal position inside the connecting box 32. The spreader plates 66', 68', 70' are separated from the inclined wall of the connecting box 32 by a vertical distance enabling the trajectories of the flows on both sides of the feed channel 28 to be obtained. This vertical distance also permits the passage of a partial flow 62" below the respective spreader plate 66', 68', 70'. The dimensions of the fixed spreader plates 66', 68', 70', especially their surface areas, are chosen so as to leave a passage on the side of the feed channel 28 and on the side opposite to the latter. Each spreader plate 66', 68', 70' is arranged essentially beneath the discharge orifice 36, 38, 40 to which the plate is allocated. As can be seen in FIGS. 1 and 2, the geometrical centre of each of the spreader plates 66', 68', 70' is aligned to a flow 62 of given flow rate. This flow rate, which is defined by the setting of the respective material gate valve 48, 50, 52, is generally an intermediate flow rate, less than the maximum rate, as illustrated in FIGS. 2 and 4. In fact, the connecting box 32, due to its funnel-shape, is able to centre the flow of material for high flow rates, though it is incapable of doing this for intermediate or low flow rates. It will be appreciated that the spreaders 66, 68, 70 provide a solution to this problem. In FIG. 2, the partial flows flow 62' and 62" both sides of the feed channel 28 can also be seen. The way in which the material is distributed by the spreader 68 is approximately indicated by the set of arrows visible in FIG. 2. It will be appreciated that once the first discharge has been released, each of the spreaders 66, 68, 70 constitute an assembly formed of a spreader plate 66', 68', 70', a retaining edge 66", 68", 70" and an accumulation of material 66''', 68''', 70'''.

FIGS. 3 and 4 show another embodiment. In FIGS. 3 and 4, identical or similar elements to those shown in FIGS. 1 and 2 are indicated by the same reference numbers. The embodiment in FIGS. 3 and 4 is similar in configuration and characteristics, so only the differences are described below. The main differences between this embodiment and the one described above consist in the way in which the spreaders 166, 168, 170 are mounted inside the connecting box 32 and in the shape of the spreader plates 166', 168', 170' that they comprise. FIG. 3 also shows the rotatable, pivotable chute 30 in operating position and the impact of the flow 62''', coaxial with the central axis 15, on to the chute 30.

As can be seen in FIGS. 3 and 4, the structure and positioning of the spreaders 166, 168 and 170 are essentially similar to the arrangement described above. However, it can be clearly seen that the spreaders 166, 168, 170, and especially their spreader plates 166', 168', 170', have a larger surface area. In order to make possible this increased surface area without blocking the passage of the charge material towards the lower discharge outlet 34 of the connecting box 32, the spreader plates 166', 168', 170' are mounted pivotable on pivot shafts 80. The pivot shafts 80 rotate in bearings in the wall of the connecting box 32 to form an axis of rotation for each of the spreader plates 166', 168', 170'. This enables each of the spreader plates 166', 168', 170' to be pivoted between an essentially vertical parking position, in which it is non-operational and does not obstruct the flow of material, and a horizontal operating position in which the spreader plate 166', 168' or 170' intercepts, divides and diverts the flow of material 62. In FIGS. 3 and 4, the spreader 168 is shown in operating position, while the spreaders 166 and 168 are in non-operating position. The pivoting of these spreaders 166, 168, 170 can advantageously be coupled to the actuation of the corresponding sealing valve 56, 58, 60. It can also be seen in FIG. 4 that the shape of the spreader plates 166', 168', 170' is pentagonal. Thus, in operating position, part of each spreader plate 166', 168', 170' partially covers the lower discharge outlet 34, and hence the feed channel 28, in order to improve the spreading of material to both sides of the latter.

Returning to FIGS. 1 and 3, two other aspects of the charging device 10 remain to be noted. The feed channel 28 comprises a first upper tubular section 28' and a second lower tubular section 28". The first aspect is that these upper tubular sections 28', 28" are tapered, that is to say that their diameter decreases towards the bottom. This enables better focalization of flows 62''' set at higher rates than that shown in FIGS. 1 and 3 on to the central axis 15. For each of the tubular sections 28', 28", this decrease in diameter is adapted to the increase in the velocity of flow according to its output direction, so as to focus the material without hindering its free flow. The second aspect is that the first tubular section protrudes to some extent into the connecting box 32, as can be seen in FIGS. 1 and 3. This has the effect of creating an obstacle in the path of the charge material on the inclined walls of the connecting box 32. The result is the formation of an accumulation of material in the form of a slope, identified by reference number 90. This permanent layer of material 90 considerably reduces the wear on the sloping walls of the connecting box 32.

The invention claimed is:

1. Charging device for a shaft furnace comprising:

at least one charging hopper having a discharge orifice, said discharge orifice being positioned off-centre with respect to the central axis of the shaft furnace;

a material distribution device arranged below said hopper, said material distribution device comprising a feed channel coaxial with the central axis of the furnace and a rotatable, pivotable chute arranged below said feed channel for distributing a charge in the shaft furnace;

a connecting box in the form of a funnel with inclined inner walls, said connecting box being arranged between said material distribution device and said hopper and comprising a central lower outlet communicating with said feed channel and at least one upper inlet positioned off-centre with respect to the central axis of the furnace and communicating with said discharge orifice;

at least one spreader plate situated inside said connecting box upstream of said distribution device and on the trajectory of material discharged from said discharge orifice; wherein said spreader plate has a generally horizontal operating position, in which it constitutes an obstacle transverse to said trajectory, for dispersing a flow of material from said discharge orifice in separate flows to both sides of said feed channel on to opposite parts of said inclined inner walls such that a collision between said separate flows in the region of said lower outlet creates a recombined flow that is essentially coaxial with said central axis.

2. Device according to claim 1, wherein said spreader plate is a fixed horizontal plate.

3. Device according to claim 1, wherein said spreader plate is a pivotable plate that can be pivoted between said operating position and a non-operating parking position, in which the plate does not obstruct the flow of material from said discharge orifice.

4. Device according to claim 3, wherein said spreader plate has a geometry such that it at least partially covers said feed channel when in operating position.

5. Device according to claim 1, wherein said spreader plate has its geometrical centre arranged on said trajectory.

6. Device according to claim 1, wherein said spreader further comprises a retaining edge able to retain an accumulation of material on said spreader.

7. Device according to claim 1, wherein said spreader comprises two opposite sides arranged contiguous with the walls of the connecting box.

8. Device according to claim 1, wherein said feed channel comprises a first upper tubular section and a second lower tubular section, the horizontal cross-section of this first and/or second tubular section tapering in the direction of the material flow.

9. Device according to claim 1, comprising three charging hoppers, each hopper having its respective discharge orifice arranged off-centre with respect to the central axis of the furnace and comprising three spreaders, a respective spreader being associated with each discharge orifice.

10. Blast furnace comprising a charging device, said charging device comprising:

at least one charging hopper having a discharge orifice, said discharge orifice being positioned off-centre with respect to the central axis of said blast furnace;

a material distribution device arranged below said hopper, said material distribution device comprising a feed channel coaxial with said central axis and a rotatable, pivotable chute arranged below said feed channel for distributing a charge in said blast furnace;

a connecting box in the form of a funnel with inclined inner walls, said connecting box being arranged between said material distribution device and said hopper and comprising a central lower outlet communicating with said feed channel and at least one upper inlet positioned off-centre with respect to the central axis of the furnace and communicating with said discharge orifice;

at least one spreader plate situated inside said connecting box upstream of said distribution device and on the trajectory of material discharged from said discharge orifice; said spreader plate having a generally horizontal operating position, in which it constitutes an obstacle transverse to said trajectory, for dispersing a flow of material from said discharge orifice in separate flows to both sides of said feed channel on to opposite parts of said inclined inner walls such that a collision between said separate flows in the region of said lower outlet creates a recombined flow that is essentially coaxial with said central axis and said spreader plate having a geometrical centre arranged on said trajectory.

11. Blast furnace according to claim 10, wherein said spreader plate is a fixed horizontal plate.

12. Blast furnace according to claim 10, wherein said spreader plate is a pivotable plate that can be pivoted between said operating position and a non-operating parking position, in which the plate does not obstruct the flow of material from said discharge orifice.

13. Blast furnace according to claim 12, wherein said spreader plate has a geometry such that it at least partially covers said feed channel when in operating position.

14. Blast furnace according to claim 10, wherein said spreader further comprises a retaining edge able to retain an accumulation of material on said spreader.

15. Blast furnace according to claim 10, wherein said spreader comprises two opposite sides arranged contiguous with the walls of the connecting box.

16. Blast furnace according to claim 10, wherein said feed channel comprises a first upper tubular section and a second lower tubular section, the horizontal cross-section of this first and/or second tubular section tapering in the direction of the material flow.

17. Blast furnace according to claim 10, comprising three charging hoppers, each hopper having its respective discharge orifice arranged off-centre with respect to the central axis of the furnace and comprising three spreaders, a respective spreader being associated with each discharge orifice.

18. Method of centering a feed channel outflow using a charging device for a shaft furnace, said charging device comprising:

at least one charging hopper having a discharge orifice, said discharge orifice being positioned off-centre with respect to the central axis of the shaft furnace;

a material distribution device arranged below said hopper, said material distribution device comprising a feed channel coaxial with the central axis of the furnace and a rotatable, pivotable chute arranged below said feed channel for distributing a charge in the shaft furnace;

a connecting box in the form of a funnel with inclined inner walls, said connecting box being arranged between said material distribution device and said hopper and comprising a central lower outlet communicating with said feed channel and at least one upper inlet positioned off-centre with respect to the central axis of the furnace and communicating with said discharge orifice;

at least one spreader plate situated inside said connecting box upstream of said distribution device and on the trajectory of material discharged from said discharge orifice; wherein said spreader plate has a generally horizontal operating position, in which it constitutes an obstacle transverse to said trajectory, for dispersing a flow of material from said discharge orifice in separate flows to both sides of said feed channel on to opposite parts of said inclined inner walls such that a collision between said separate flows in the region of said lower outlet creates a recombined flow that is essentially coaxial with said central axis;

said method comprising:

using said spreader plate in said generally horizontal operating position, in which it constitutes an obstacle transverse to said trajectory, to disperse a flow of material from said discharge orifice in separate flows to both sides of said feed channel on to opposite parts of said inclined inner walls;

colliding said separate flows in the region of said lower outlet thereby creating a recombined flow that is essentially coaxial with said central axis.

19. Method according to claim 18, wherein said recombined flow impacts on said chute in an impact zone which is centred on said central axis.

20. Method according to claim 19, wherein the respective mass flow rates of said separate flows are similar.

21. Method according to claim 18, wherein said recombined flow impacts centrally on a charging surface of said blast furnace.

22. Method according to claim 21, wherein the respective mass flow rates of said separate flows are similar.

23. Method according to claim 18, wherein the respective mass flow rates of said separate flows are similar.

* * * * *